(12) United States Patent
Murayama (10) Patent No.: US 12,147,085 B2
(45) Date of Patent: Nov. 19, 2024

(54) OPTICAL COMPONENT AND METHOD OF MANUFACTURING OPTICAL COMPONENT

(71) Applicant: OLYMPUS CORPORATION, Tokyo (JP)

(72) Inventor: Kazuaki Murayama, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 922 days.

(21) Appl. No.: 17/128,801

(22) Filed: Dec. 21, 2020

(65) Prior Publication Data

US 2021/0109306 A1 Apr. 15, 2021

Related U.S. Application Data

(63) Continuation of application No. PCT/JP2018/023854, filed on Jun. 22, 2018.

(51) Int. Cl.
*G02B 7/00* (2021.01)
*B29C 64/112* (2017.01)
(Continued)

(52) U.S. Cl.
CPC ............ *G02B 7/003* (2013.01); *B29C 64/112* (2017.08); *B29D 11/00009* (2013.01);
(Continued)

(58) Field of Classification Search
CPC .......... G02B 7/003; G02B 3/00; G02B 7/022; G02B 2003/0093; B29C 64/112;
(Continued)

(56) References Cited

U.S. PATENT DOCUMENTS 9,601,670 B2 * 3/2017 Bhat ..................... H01L 33/387
2016/0181309 A1 * 6/2016 Uehira ............. H01L 27/14627
257/432

FOREIGN PATENT DOCUMENTS

JP 2000266979 A 9/2000
JP 2007039262 A 2/2007
(Continued)

OTHER PUBLICATIONS

International Search Report and Written Opinion dated Jul. 24, 2018 received in PCT/JP2018/023854.
(Continued)

*Primary Examiner* — Mustak Choudhury
(74) *Attorney, Agent, or Firm* — Scully, Scott, Murphy & Presser, P.C.

(57) ABSTRACT

An optical component includes: a lens that includes a lens surface and a tapered side surface, the tapered side surface extending from an outer circumference of the lens surface in an axial direction that intersects the lens surface and having an outer diameter progressively larger away from the lens surface. A center of the outer circumference of the lens surface is displaced, in a direction intersecting the axial direction, from a center of an outer circumference of the side surface at a position distanced from the lens surface in the axial direction. The optical component may further include a frame body in which the lens is fitted. The frame body may include a tapered engaging surface corresponding to the side surface of the lens. The lens may be fitted in the frame body and is positioned in a circumferential direction about the axial direction.

14 Claims, 5 Drawing Sheets

(51) Int. Cl.
   *B29D 11/00*    (2006.01)
   *B33Y 10/00*    (2015.01)
   *B33Y 80/00*    (2015.01)
   *G02B 3/00*     (2006.01)
   *G02B 7/02*     (2021.01)
   *B29L 11/00*    (2006.01)

(52) U.S. Cl.
   CPC ............... *B33Y 10/00* (2014.12); *B33Y 80/00* (2014.12); *G02B 3/00* (2013.01); *G02B 7/022* (2013.01); *B29L 2011/0016* (2013.01); *G02B 2003/0093* (2013.01)

(58) Field of Classification Search
   CPC ........ B29D 11/00009; B29D 11/00442; B33Y 10/00; B33Y 80/00; B29L 2011/0016
   See application file for complete search history.

(56) References Cited

FOREIGN PATENT DOCUMENTS

| | | |
|---|---|---|
| JP | 2007095751 A | 4/2007 |
| JP | 2015515937 A | 6/2015 |
| JP | 2016224387 A | 12/2016 |
| WO | 2017094072 A1 | 6/2017 |

OTHER PUBLICATIONS

Japanese Office Action dated Nov. 2, 2021 received in 2020-525209.
Chinese Office Action dated Oct. 29, 2021 received in 201880094791.5.

\* cited by examiner

OPTICAL COMPONENT AND METHOD OF MANUFACTURING OPTICAL COMPONENT

CROSS-REFERENCE TO RELATED APPLICATIONS

This application is based upon and claims the benefit of priority from International Application No. PCT/JP2018/023854, filed on Jun. 22, 2018, the entire content of which is incorporated herein by reference.

BACKGROUND OF THE INVENTION

1. Field of the Invention

The present invention relates to an optical component and a method of manufacturing an optical component.

2. Description of the Related Art

Methods of manufacturing an optical component such as a lens by using an inkjet 3D printing technology have been proposed (see, for example, patent literature 1).
[Patent literature 1] JP2015-515937

It is preferred that an optical component manufactured built into the optical system of a product be easily aligned with the optical system.

SUMMARY OF THE INVENTION

The present invention addresses the above-described issue, and a general purpose thereof is to provide an optical component that can be aligned easily.

An optical component according to an embodiment of the present invention includes: a lens that includes a lens surface and a tapered side surface, the tapered side surface extending from an outer circumference of the lens surface in an axial direction that intersects the lens surface and having an outer diameter progressively larger away from the lens surface. A center of the outer circumference of the lens surface is displaced, in a direction intersecting the axial direction, from a center of an outer circumference of the side surface at a position distanced from the lens surface in the axial direction.

Another embodiment of the present invention also relates to an optical component. The optical component includes: a lens that includes a lens surface and a tapered side surface, the tapered side surface extending from an outer circumference of the lens surface in an axial direction that intersects the lens surface and having an outer diameter progressively larger away from the lens surface. An angle of inclination of the side surface with respect to a plane orthogonal to the axial direction differs depending on a position in a circumferential direction about the axial direction.

Still another embodiment of the present invention relates to a method of manufacturing an optical component. The method includes building a hardened layer on a reference plane, the hardened layer being formed by irradiating a photocrosslinkable material ejected from a molding head with light, thereby forming a lens, the lens including a tapered side surface, which has an outer diameter progressively smaller away from the reference plane in an axial direction, and a lens surface having an outer circumference defined by an edge of the side surface, and a center of the outer circumference of the lens surface being displaced, in a direction along the reference plane, from a center of an outer circumference of the side surface on the reference plane.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A detailed description will be given of embodiments of the present invention with reference to the drawings. In the explanations of the figures, the same elements shall be denoted by the same reference numerals, and duplicative explanations will be omitted appropriately. The configuration described below is by way of example only and does not limit the scope of the present invention.

Figure 1:
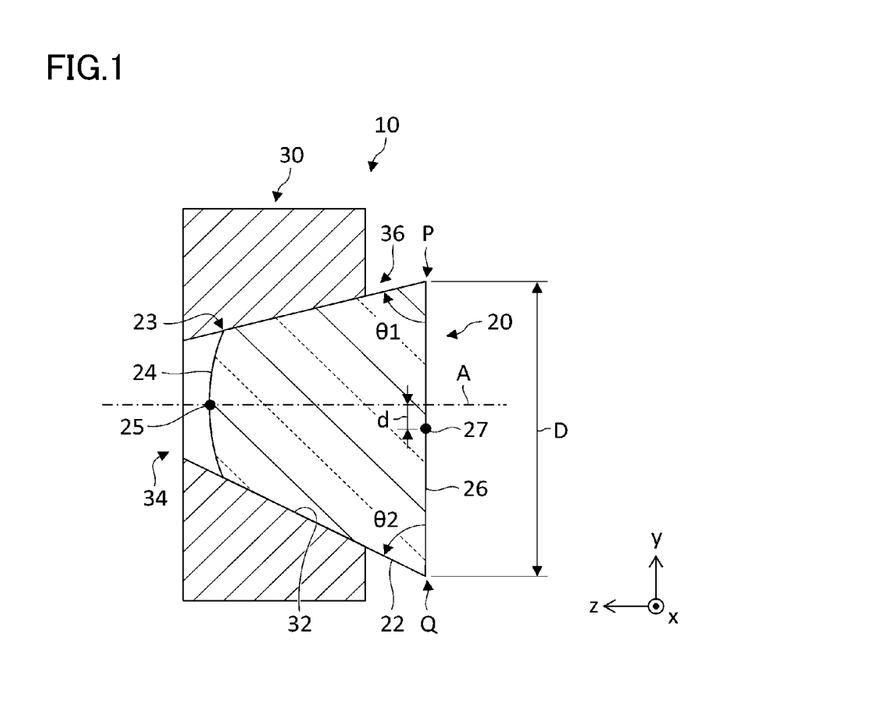
FIG. 1 is a cross-sectional view schematically showing a configuration of an optical component according to an embodiment.

FIG. 1 is a cross-sectional view schematically showing a configuration of an optical component 10 according to an embodiment. The optical component 10 includes a lens 20 and a frame body 30. The optical component 10 can be built into an arbitrary optical system, including a refracting optical element such as a lens and a reflecting optical element such as a mirror, and be used accordingly.

The optical component 10 need be accurately aligned with a light axis A of the optical system in order to realize a desired optical characteristic in the optical system. More specifically, the optical component 10 need be positioned in the axial direction along the light axis A, the radial direction orthogonal to the light axis A, and the circumferential direction about the light axis A. In this embodiment, a side surface 22 of the lens 20 is formed to be rotationally asymmetrical about the light axis A, and an engaging surface 32 of the frame body 30 is formed to have a rotationally asymmetrical shape corresponding to the side surface 22 of the lens 20. As a result, the alignment of the lens 20 is completed merely by fitting the lens 20 in the frame body 30 so long as the frame body 30 is accurately positioned with respect to the light axis A. According to this embodiment, the step of aligning the lens 20 is simplified.

Referring to the drawing, the direction along the light axis A is defined as the z direction, and the directions orthogonal to the z direction are defined as the x direction and the y direction. FIG. 1 shows a cross section along the yz plane of the optical component 10.

The lens 20 includes the side surface 2, a lens surface 24, and an end surface 26. The side surface 22 has a tapered shape having an outer diameter progressively smaller away from the end surface 26 in the axial direction. Stated otherwise, the side surface 22 has a tapered shape having an outer diameter progressively larger away from the lens surface 24. The side surface 22 is rotationally asymmetrical about the light axis A, and the angle of inclination with respect to the end surface 26 (e.g., angle θ1, θ2) differ depending on the position in the circumferential direction. In the cross section of FIG. 1, the first angle of inclination θ1 of the side surface 22 with respect to the end surface 26 at a point P is larger than the second angle of inclination θ2 with respect to the end surface 26 at a point Q.

The embodiment is non-limiting as to the angle of inclination of the side surface 22 with respect to the end surface 26. For example, the angle of inclination may be not less than 65° and not more than 80°. The embodiment is also non-limiting as to the difference between the maximum value and the minimum value of the angle of inclination of the side surface 22 with respect to the end surface 26. For example, the difference may be not less than 1° and not more than 15°. In one example, the maximum value (θ1) of the angle of inclination of the side surface 22 with respect to the end surface 26 is 80°, and the minimum value (θ2) of the angle of inclination of the side surface 22 with respect to the end surface 26 is 65°.

The lens surface 24 is positioned at one end of the side surface 22 having a tapered shape, and the outer circumference of the lens surface 24 is defined by an edge 23 of the side surface. The lens surface 24 is formed by an arbitrary curved shape such as a convex curved shape or a concave curved shape. The lens surface 24 may be rotationally symmetrical about the light axis A or rotationally symmetric. The lens surface 24 may have different curvatures in the x direction and in the y direction and may be a free-form surface such as a biconic surface. In the illustrated example, a center 25 of the lens surface 24 is positioned on the light axis A. In one variation, the center 25 of the lens surface 24 may be displaced from the light axis A. In other words, the lens surface 24 may be eccentric with respect to the light axis A. Further, the lens surface 24 may be orthogonal or not orthogonal to the light axis A at the intersection between the lens surface 24 and the light axis A.

The end surface 26 is positioned at the other end of the tapered side surface 22 and is opposite to the lens surface 24 in the axial direction. Unlike the lens surface 24, the end surface 26 is a flat surface. The end surface 26 is orthogonal to the light axis A and so can be said to be a reference plane. A center 27 of the end surface 26 is displaced from the light axis A and is distanced from the light axis A by a distance d in a direction along the end surface 26 (e.g., the y direction). Therefore, the center 27 of the end surface 26 is displaced from the center 25 of the lens surface 24 in the direction along the end surface 26. Further, the center of the outer circumference of the side surface 22 is displaced from the center of the outer circumference of the lens surface 24 in a radial direction, at an arbitrary position distanced from the lens surface 24 in the axial direction.

Figure 2:
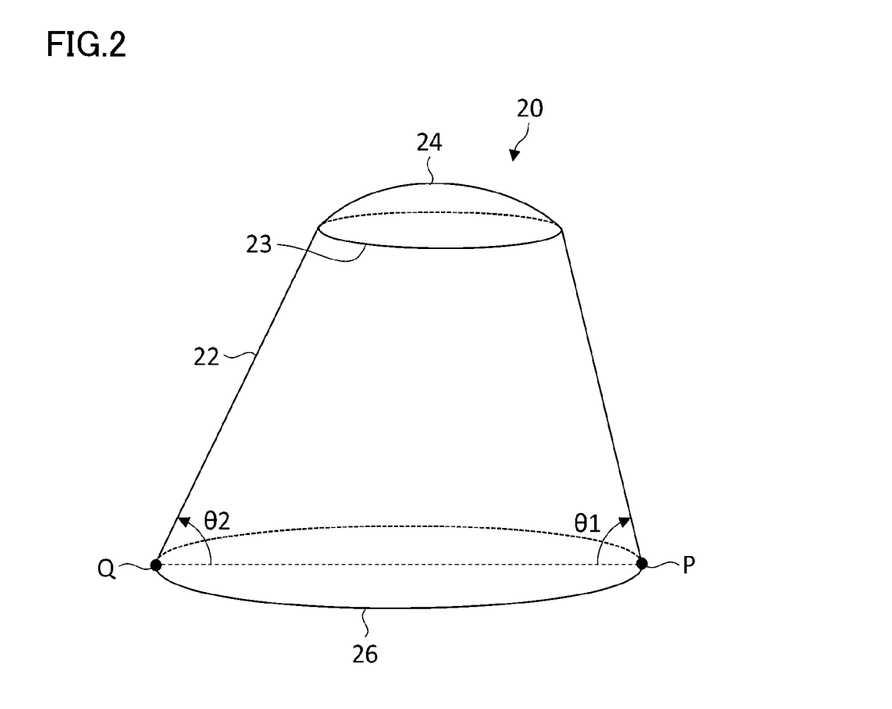
FIG. 2 is a perspective view showing a structure of the lens of FIG. 1.
Figure 3:
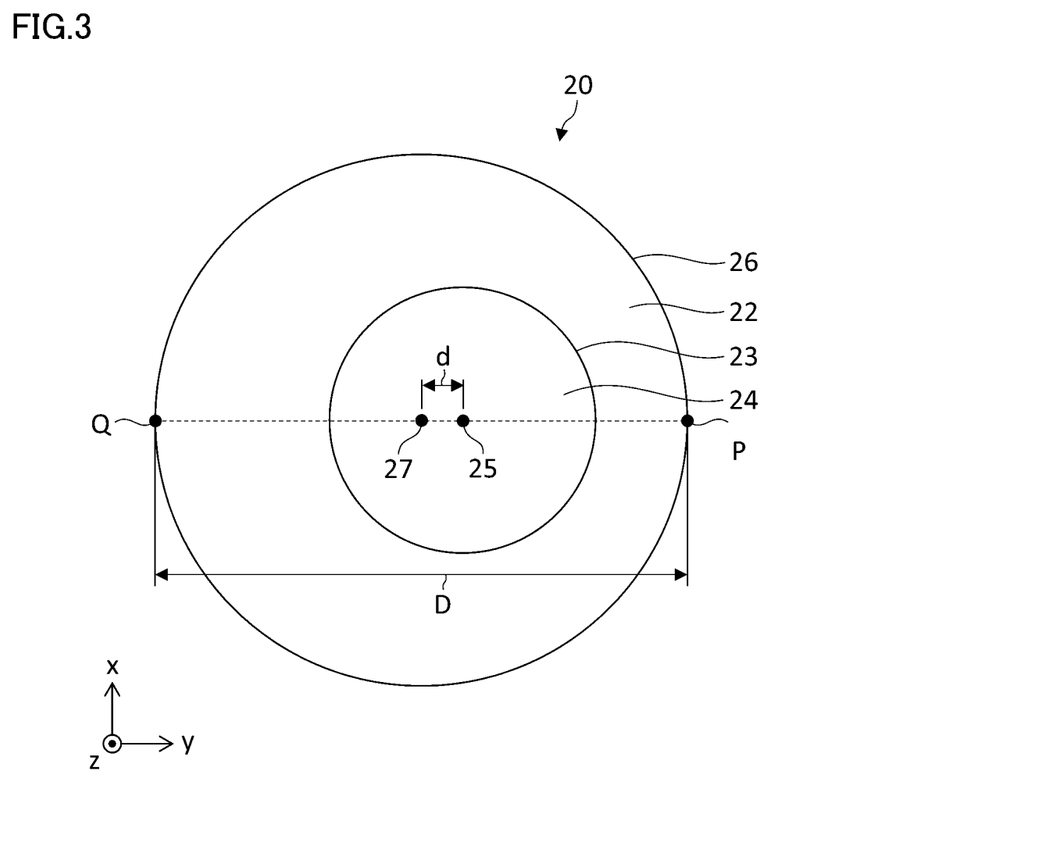
FIG. 3 is a top view showing a structure of the lens of FIG. 1.

FIG. 2 is a perspective view showing a structure of the lens 20 of FIG. 1, and FIG. 3 is a top view showing a structure of the lens 20 of FIG. 1. As illustrated, an edge 23 of the outer circumference of the lens surface 24 is circular, and the outer circumference of the end surface 26 is also circular. The side surface 22 connects the outer circumference of the lens surface 24 and the outer circumference of the end surface 26. The side surface 22 extends from the edge 23 of the outer circumference of the lens surface 24 toward the outer circumference of the end surface 26 and has a shape close to the side surface of a circular cone. The center 25 of the lens surface 24 is displaced from the center 27 of the end surface 26. A distance d between the center 25 of the lens surface 24 and the center 27 of the end surface 26 is, for example, not less than 1% and not more than 30% an outer diameter D of the side surface 22.

Referring back to FIG. 1, the frame body 30 includes an engaging surface 32, a first opening 34, and a second opening 36. The engaging surface 32 is a support surface directly in contact with the side surface 22 of the lens 20 to support the lens 20 and has a tapered surface corresponding to the side surface 22 of the lens 20. Therefore, the engaging surface 32 of the frame body 30 is rotationally asymmetrical about the light axis A, like the side surface 22 of the lens 20. The engaging surface 32 extends from the first opening 34 toward the second opening 36.

The first opening 34 is positioned at one end of the tapered engaging surface 32 having a tapered shape. The first opening 34 is provided to pass the light incident on the lens surface 24 of the lens 20 fixed in the frame body 30 or the light exiting the lens surface 24. The shape of the first opening 34 is not limited to any particular shape and may be circular. The opening size of the first opening 34 is smaller than the edge 23 of the outer circumference of the lens surface 24 of the lens 20. By configuring the opening size of the first opening 34 to be smaller than the outer circumference of the lens surface 24, the lens 20 can be accommodated and fixed inward of the first opening 34. In one variation, the opening size of the first opening 34 may be larger than the outer diameter of the lens surface 24. In this case, the lens 20 can be fixed, with the lens 20 projecting beyond the first opening 34 in the axial direction.

The second opening 36 is positioned at the other end of the tapered engaging surface 32. The second opening 36 is provided to pass the light exiting the end surface 26 fixed to the frame body 30 or the light incident on the end surface 26. The shape of the second opening 36 is not limited to any particular shape and may be circular. The opening size of the second opening 36 is larger than the outer diameter of the lens surface 24 and smaller than the outer diameter D of the lens 20. By configuring the opening size of the second opening 36 to be smaller than the outer diameter D of the end surface 26 of the lens 20, the lens 20 can be fixed, with the lens 20 projecting beyond the frame body 30 in the axial direction. As a result, it is possible to maintain the side surface 22 of the lens 20 when the lens 20 is fitted in the frame body 30 and to fix the lens 20 in the frame body 30 without touching the lens surface 24 or the end surface 26.

Figure 4:
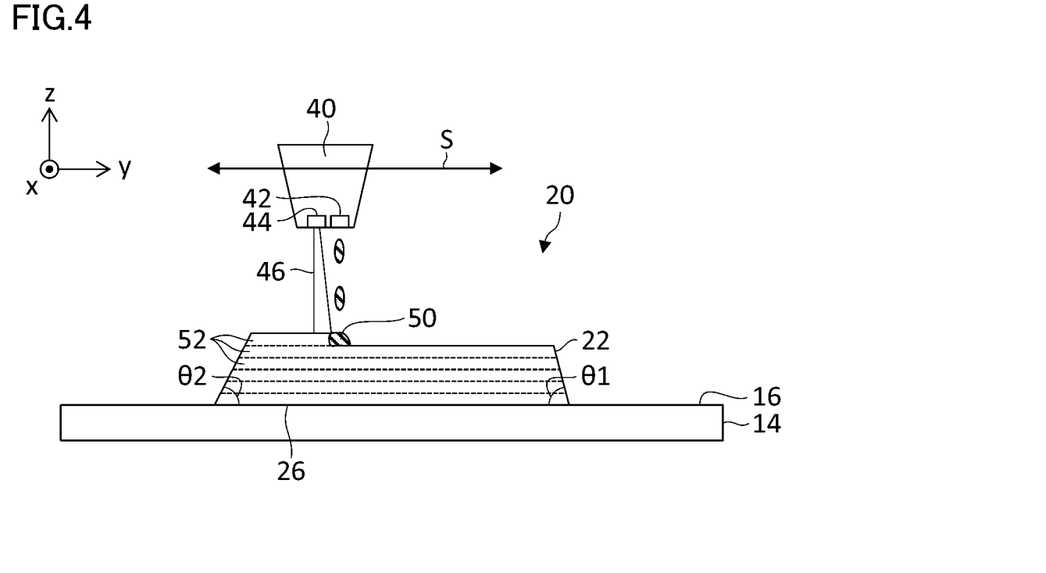
FIG. 4 schematically shows a step of manufacturing the lens of FIG. 1.

A description will now be given of a method of manufacturing the optical component 10. FIG. 4 schematically shows a step of manufacturing the lens 20 of FIG. 1. The lens 20 can be manufactured by using an inkjet 3D printing technology. The lens 20 is formed by building a plurality of hardened layers 52 on a base 14 having a reference plane 16.

The hardened layer 52 is formed by irradiating a photocrosslinkable material 50 ejected from a molding head 40 with a hardening light 46 such as ultraviolet light. The molding head 40 includes an ejecting unit 42 for ejecting the photocrosslinkable material 50 and an irradiation unit 44 for irradiating the ejected photocrosslinkable material 50 with the hardening light 46. The hardened layer 52 is formed by driving the molding heat 40 for a scan above the reference plane 16 in a direction of an arrow S, ejecting the photocrosslinkable material 50 to a portion where the lens 20 should be formed, and irradiating the portion with the hardening light 46 to harden the photocrosslinkable material 50. By configuring the angle of inclination (e.g., θ1, θ2) of the side surface 22 of the lens 20 with respect to the reference plane 16 to be not less than 65° and not more than 80°, the hardened layer 52 can be built with high precision. By stacking a plurality of hardened layer 52 formed in this way, the lens 20 is formed.

The direction of stack in the lens 20 is aligned with the axial direction of the lens 20. The reference plane 16 on which the lens 20 is built can be said to be a plane defined in the radial direction and the circumferential direction orthogonal to the axial direction of the lens 20.

The frame body 30 having the tapered engaging surface 32 corresponding to the side surface 22 of the lens 20 is then formed. Like the lens 20, the frame body 30 can be manufactured by an inkjet 3D printing technology. The frame body 30 may be manufactured by a method different from 3D printing.

Figure 5:
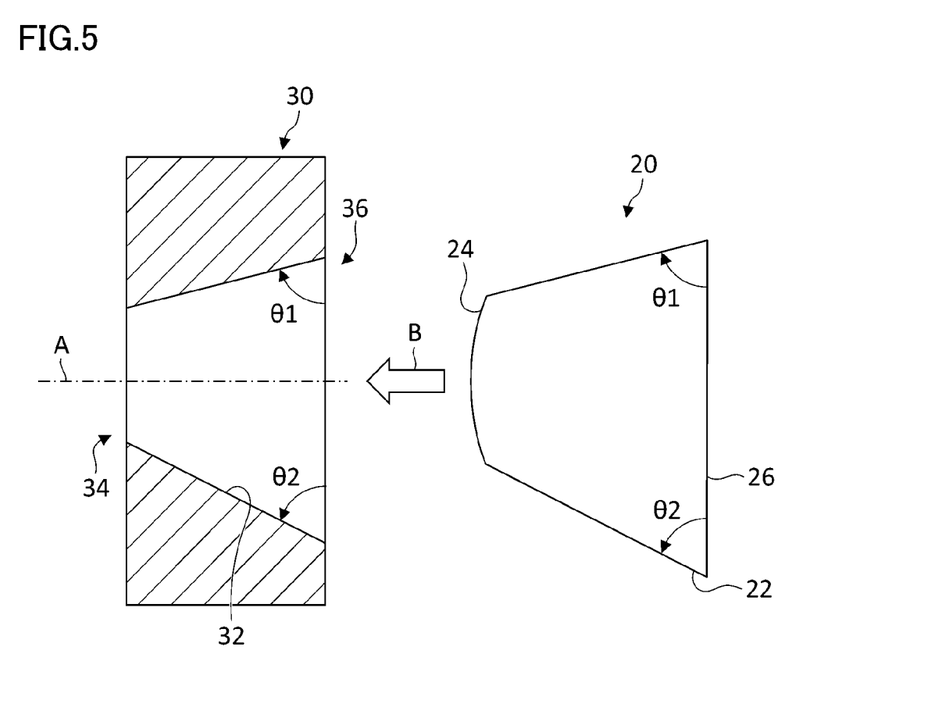
FIG. 5 schematically shows a step of assembling the optical component of FIG. 1.

FIG. 5 schematically shows a step of assembling the optical component 10 of FIG. 1. First, the frame body 30 is positioned and fixed with respect to the light axis A of the optical system in which the lens 20 is built. The lens 20 is then inserted into the frame body 30 as indicated by an arrow B. Since each of the side surface 22 of the lens 20 and the engaging surface 32 of the frame body 30 is rotationally asymmetrical, the lens 20 cannot be fixed in the frame body 30 properly unless the orientation of the lens 20 in the circumferential direction about the light axis A and that of the frame body 30 are aligned. Stated otherwise, the orientation of the lens 20 in the circumferential direction and the position thereof in the axial direction are determined and the alignment of the lens 20 is completed merely by fitting the lens 20 in the frame body 30 properly.

Figure 6:
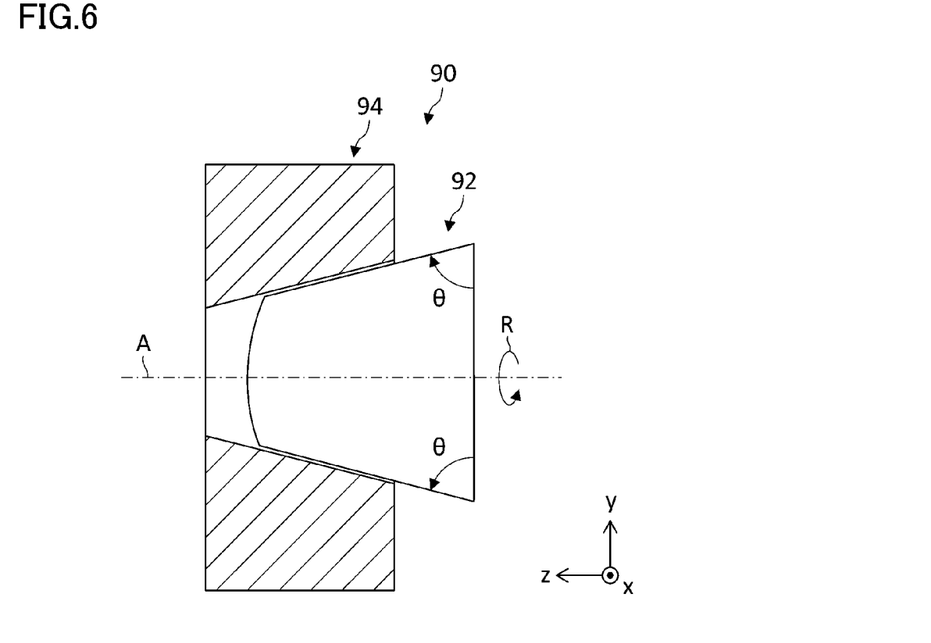
FIG. 6 is a cross-sectional view schematically showing a configuration of an optical component according to a comparative example.

FIG. 6 is a cross-sectional view schematically showing a configuration of an optical component 90 according to a comparative example. In the comparative example, the side surface of a lens 92 and the engaging surface of a frame body 94 are rotationally symmetrical about the light axis A. In other words, the angle of inclination θ of the side surface of the lens 92 is the same regardless of the position in the circumferential direction about the light axis A. For this reason, the lens 92 is rotatable with respect to the frame body 94 in the circumferential direction (R direction) even if the lens 92 is fitted in the frame body 94. This makes it impossible to determine the orientation of the lens 92 in the circumferential direction and requires a separate adjustment step for positioning in the circumferential direction. It also makes it necessary to use an adhesive to fix the lens 92 after the lens 92 is positioned or attaching a clamping component separately.

According to the embodiment shown in FIG. 1, on the other hand, the lens 20 can be positioned in the axial direction and the circumferential direction merely by fitting the lens 20 in the frame body 30. Further, since the rotation of the lens 20 in the circumferential direction about the light axis A is restricted by the frame body 30, it is not necessary to fix the lens 20 by using an adhesive or a clamping component after the lens 20 is fitted in the frame body 30. Thus, the step of aligning the lens 20 is simplified according to the embodiment.

In this embodiment, a focus is on the tapered shape of the side surface 22 produced inherently when the lens 20 is manufactured by using a 3D printing technology. When a 3D printing technology is used, it will be difficult to form the side surface 22 of the lens 20 to be precisely perpendicular with respect to the reference plane 16, and the side surface 22 will be inclined. We have focused on the tilt of the side surface 22 and have configured the lens 20 to have the side surface 22 that has a rotationally asymmetrical shape and to be shaped so that the lens 20 cannot be rotated when fitted in the frame body 30. According to the embodiment, the side surface 22 having a rotationally asymmetrical shape like this can be formed merely by displacing the position of the center 25 of the lens surface 24 and position of the center 27 of the end surface 26 from each other. It is therefore possible to realize the lens 20 having a rotationally asymmetrical shape while also minimizing the design change from an ordinary rotationally symmetrical lens. Since a projecting shape or a notch shape to produce a rotationally asymmetrical shape is not necessary, the shape of the lens 20 is prevented from becoming complicated. This mitigates the manufacturing condition of the lens 20 and makes it possible to manufacture the lens 20 more easily.

According to the embodiment, the rotation of the lens 20 fitted in the frame body 30 is suitably prevented by configuring the distance d between the center 25 of the lens surface 24 and the center 27 of the end surface 26 to be 1% or larger than the outer diameter D of the lens 20. Further, the outer diameter of the end surface 26 is prevented from becoming excessively large relative to the outer diameter of the lens surface 24 by configuring the distance d between the center 25 of the lens surface 24 and the center 27 of the end surface 26 to be 30% or smaller than the outer diameter D of the lens 20. In other words, the lens 20 is prevented from becoming excessively large-sized.

Figure 7:
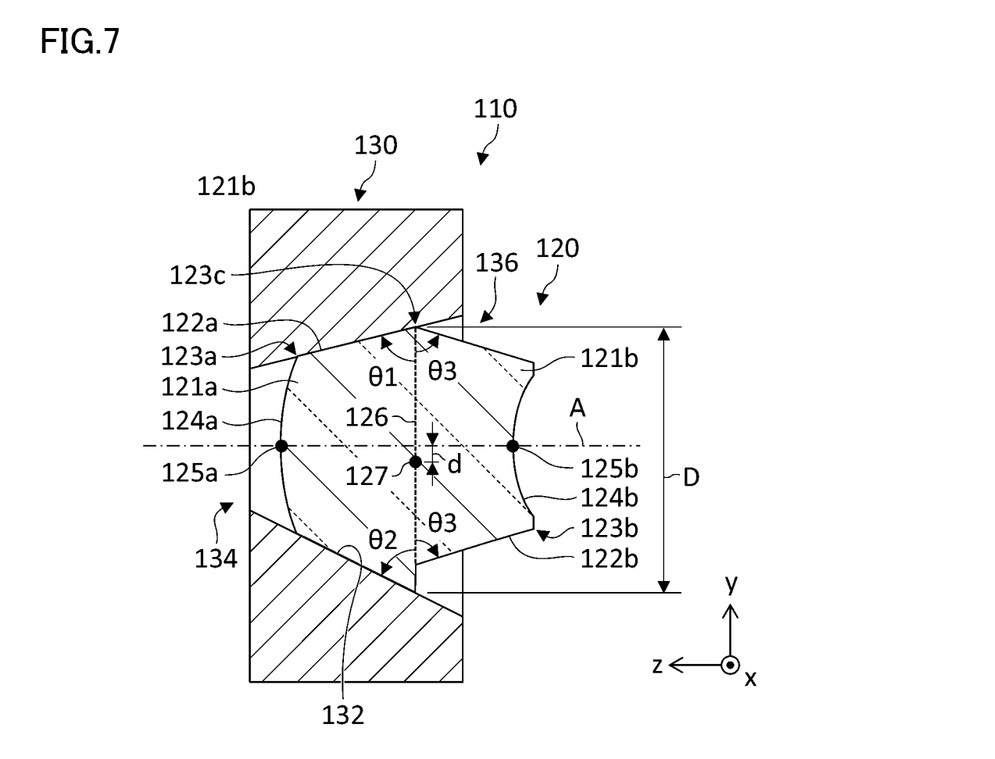
FIG. 7 is a cross-sectional view schematically showing a configuration of the optical component according to another embodiment.

FIG. 7 is a cross-sectional view schematically showing a configuration of an optical component 110 according to another embodiment. The optical component 110 includes a lens 120 and a frame body 130. This embodiment differs from the embodiment described above in that the lens 120 includes a first lens portion 121a and a second lens portion 121b and includes two lens surfaces (a first lens surface 124a and a second lens surface 124b). The following description highlights the difference from the embodiment described above.

The lens 120 includes a tapered side surface 122, the first lens surface 124a, and the second lens surface 124b. The side surface 122 includes a first tapered portion 122a and a second tapered portion 122b. The outer diameter of the first tapered portion 122a is progressively smaller away from a reference plane 126 in a first direction (+z direction) along the light axis A. The outer diameter of the second tapered portion 122b is progressively smaller away from the reference plane 126 in a second direction (−z direction) along the light axis A opposite to the first direction. The reference plane 126 is a boundary surface between the first tapered portion 122a and the second tapered portion 122b and is positioned at a location where the outer diameter of the lens 120 has a maximum value D. The reference plane 126 can be said to be a bonding surface of the first lens portion 121a and the second lens portion 121b. The reference plane 126 is a plane orthogonal to the light axis A.

The outer circumference of the first lens surface 124*a* is defined by an edge 123*a* of the first tapered portion 122*a* (also referred to as a first edge). The first lens surface 124*a* is comprised of a convex curved shape. A center 125*a* of the first lens surface 124*a* is positioned on the light axis A. The outer circumference of the second lens surface 124*b* is defined by an edge of the second tapered portion 122*b* (also referred to as a second edge). The second lens surface 124*b* is comprised of a concave curved shape. A center 125*b* of the second lens surface 124*b* is positioned on the light axis A. Therefore, the positions of the centers 125*a*, 125*b* of the first lens surface 124*a* and the second lens surface 124*b* in the direction along the reference plane 126 are aligned.

The lens 120 includes an edge 123*c* bounded by the first tapered portion 122*a* and the second tapered portion 122*b* (also referred to as a third edge). The third edge 123*c* is positioned at a location where the outer diameter of the lens 120 has the maximum value. A center 127 of the outer circumference defined by the third edge 123*c* is displaced from the light axis A. Therefore, the center 127 of the outer circumference of the lens 120 is displaced from the centers 125*a*, 125*b* of the first lens surface 124*a* and the second lens surface 124*b* by a distance d in the direction along the reference plane 126. The amount of displacement d of the center 127 of the outer circumference of the lens 120 may be, for example, not less than 1% and not more than 30% the outer diameter D of the lens 120.

The first tapered portion 122*a* has a shape rotationally asymmetrical about the light axis A. In other words, the angle of inclination (e.g., θ1, θ2) of the first tapered portion 122*a* with respect to the reference plane 126 differs depending on the position in the circumferential direction. Meanwhile, the second tapered portion 122*b* has a shape rotationally symmetrical about the light axis A. In other words, the angle of inclination (e.g., θ3) of the second tapered portion 122*b* with respect to the reference plane 126 is the same regardless of the position in the circumferential direction. In one variation, the second tapered portion 122*b* may have a shape rotationally asymmetrical about the light axis A. In other words, the angle of inclination of the second tapered portion 122*b* with respect to the reference plane 126 may differ depending on the position in the circumferential direction.

The frame body 130 includes an engaging surface 132, a first opening 134, and a second opening 136. The engaging surface 132 has a tapered shape corresponding to the first tapered portion 122*a* of the lens 120. The engaging surface 132 is directly in contact with the first tapered portion 122*a* to support the lens 120. The first opening 134 is provided to pass the light incident on the first lens surface 124*a* of the lens 120 fixed in the frame body 130 or the light exiting the first lens surface 124*a*. The opening size of the first opening 134 is smaller than the first edge 123*a* of the outer circumference of the first lens surface 124*a*. The second opening 136 is provided to pass the light exiting the second lens surface 124*b* of the lens 120 fixed in the frame body 130 or the light incident on the second lens surface 124*b*. The opening size of the second opening 136 is larger than the outer diameter D of the lens 120. In one variation, the opening size of the first opening 134 may be larger than the outer diameter of the first lens surface 124*a*. The opening size of the second opening 136 may be smaller than the outer diameter D of the lens 120.

The lens 120 is fitted in the frame body 130, with a portion of the lens 120 projecting beyond the frame body 130 in the direction of the light axis A. In one variation, the lens 120 may be fitted in the frame body 130, with the lens 120 not projecting beyond the frame body 130 in the direction of the light axis A. In other words, the second lens surface 124*b* may be positioned inward of the second opening 136 of the frame body 130.

Figure 8:
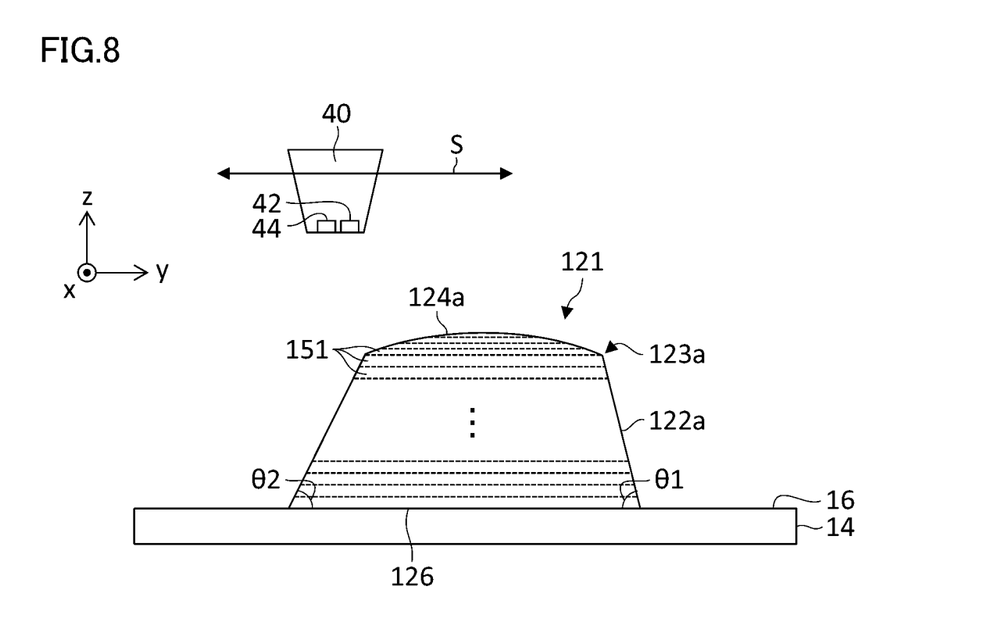
FIG. 8 shows a step of manufacturing the lens of FIG. 7.
Figure 9:
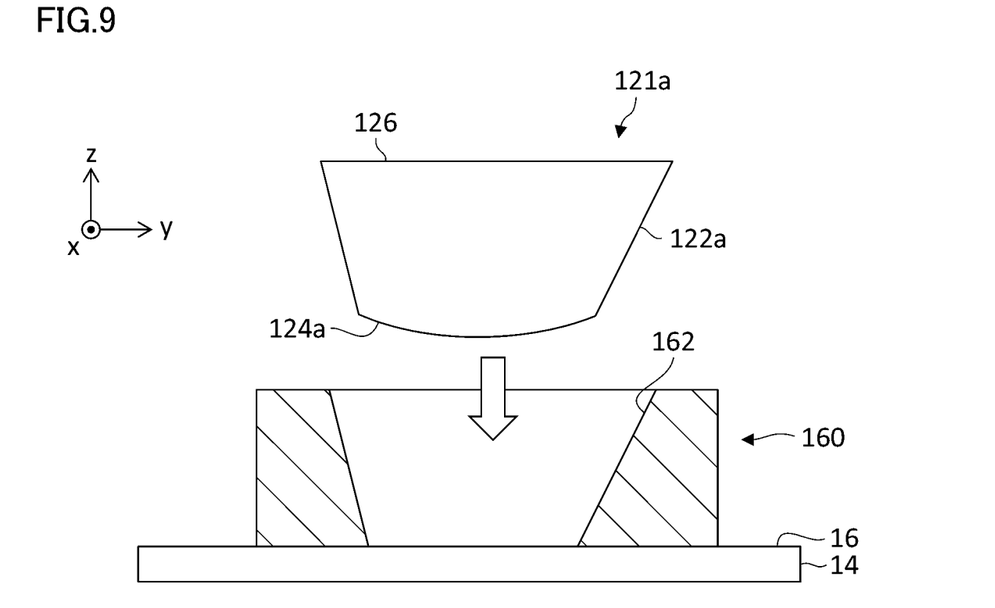
FIG. 9 shows a step of manufacturing the lens of FIG. 7.
Figure 10:
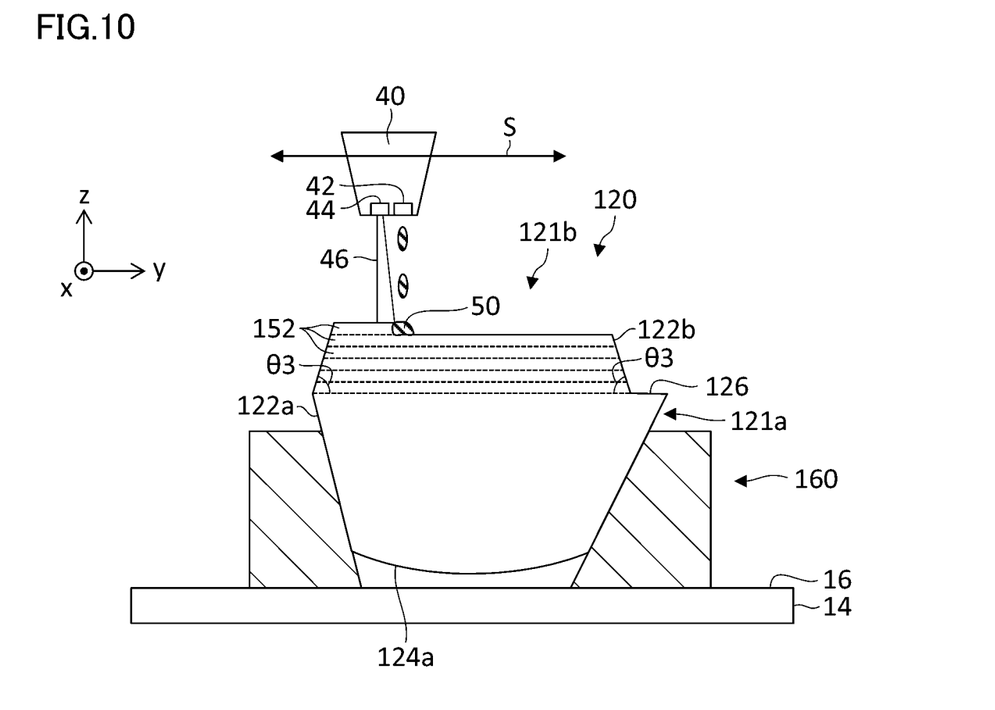
FIG. 10 shows a step of manufacturing the lens of FIG. 7.

A description will now be given of a method of manufacturing the optical component 110. FIGS. 8-10 show steps of manufacturing the lens 120 of FIG. 7. First, as shown in FIG. 8, the first lens portion 121*a* including the first tapered portion 122*a* and the first lens surface 124*a* is formed. As in the embodiment described above, the first lens portion 121*a* can be manufactured by using an inkjet 3D printing technology and can be formed by stacking a plurality of hardened layers 151 on the reference plane 16 of the base 14.

A clamping jig 160 shown in FIG. 9 is prepared. The clamping jig 160 is a member for temporarily clamping the first lens portion 121*a* formed in the step shown in FIG. 8 and includes a support surface 162 corresponding to the shape of the first tapered portion 122*a*. Like the first lens portion 121*a*, the clamping jig 160 can be manufactured by using a 3D printing technology. The clamping jig 160 may have the same shape as the frame body 130 described above, and the frame body 130 may be used as the clamping jig 160.

The first lens portion 121*a* is then fitted in the clamping jig 160 to fix the first lens portion 121*a*. In this process, the first lens portion 121*a* is fixed, with the bottom surface (the reference plane 126) of the first lens portion 121*a* being in a level position.

As shown in FIG. 10, a hardened layer 152 is then built on the bottom surface (the reference plane 126) of the first lens portion 121*a* to form the second lens portion 121*b* of the lens 120. The second lens portion 121*b* is a portion having the second tapered portion 122*b* and the second lens surface 124*b*. By forming the first lens portion 121*a* and the second lens portion 121*b* in an integrated manner in this way, the lens 120 shown in FIG. 7 is completed. By then fitting the lens 120 in the frame body 130, the optical component 110 shown in FIG. 7 is completed.

According to this embodiment, the lens 120 can be easily aligned with the light axis A as in the embodiment described above. Further, by configuring the first tapered portion 122*a* fitted in the frame body 130 to have a rotationally asymmetrical shape and, on the other hand, forming the second tapered portion 122*b* not fitted in the frame body 130 to have a rotationally symmetrical shape, the material and cost required to manufacture the lens 120 are reduced. In other words, the surplus portion required by forming the second tapered portion 122*b* to have a rotationally asymmetrical shape is saved.

In this embodiment, the shapes of the two lens surfaces 124*a*, 124*b* need not be a combination of a convex curved surface and a concave curved surface. The two lens surfaces 124*a*, 124*b* may be arbitrary. Both may be convex curved surfaces, and both may be concave curved surfaces. At least one of the two lens surfaces 124*a*, 124*b* may be a plane. In the case at least one of the two lens surfaces 124*a*, 124*b* is a plane, the plane may be orthogonal to the light axis A or may be an inclined surface diagonally intersecting the light axis A. In the case both of the two lens surfaces 124*a*, 124*b* are inclined surfaces, the lens 120 may function as parallel flat plates instead of as a lens. Therefore, the lens described above may be interpreted as meaning an optical element.

The present invention has been described with reference to the embodiments but is not limited to the embodiments described above. Appropriate combinations or replacements of the features of the illustrated examples are also encompassed by the present invention. The embodiments may be modified by way of combinations, rearranging of the processing sequence, design changes, etc., based on the knowledge of a skilled person, and such modifications are also within the scope of the present invention.

The outer circumferences of the lens surface 24, the end surface 26, the first lens surface 124a, and the second lens surface 124b are described in the embodiments above as being circular. In one variation, the outer circumferences may not have a shape of a circle but may have a shape of an ellipse, a polygon, a triangle, a rectangle, a square, a parallelogram, a hexagon, or an octagon or have any of other arbitrary shapes. For example, one of the outer circumference of the lens surface 24 and the outer circumference of the end surface 26 may have a shape of a circle, and the other of the outer circumference of the lens surface 24 and the outer circumference of the end surface 26 may have a shape other than a circle (e.g., an ellipse or a polygon). The position of the geometric center or the gravitational center of an arbitrary shape bounded by the outer circumference of the lens surface or the end surface may be used as the central position of the outer circumference of the lens surface or the end surface. The central position of the outer circumference of the lens surface or the end surface may be a middle point between the two intersections of the straight line extended in the radial direction orthogonal to the axial direction with the outer circumference.

The axial direction (the height direction) of the lens 20, 120 is described in the embodiments above as being aligned with the light axis A of the optical system in which the lens 20, 120 is built. In one variation, the light axis A of the optical system in which the lens 20, 120 is built may not be aligned with the axial direction of the lens 20, 120. For example, the lens 20, 120 may be used such that the axial direction of the lens 20, 120 diagonally intersects the light axis A of the optical system in which the lens 20, 120 is built. Further, the lens 20, 120 may be centered and used such that the center of the lens surface 24, 124a, 124b is aligned with the light axis A of the optical system. Alternatively, the lens 20, 120 may be used such that the center of the lens surface 24, 124a, 124b is eccentric from the light axis A of the optical system in the radial direction.

What is claimed is:

1. An optical component comprising:
   a lens that includes a lens surface and a tapered side surface, the tapered side surface extending from an outer circumference of the lens surface in an optical axial direction that intersects the lens surface and having an outer diameter progressively larger away from the lens surface, wherein
   a center of the outer circumference of the lens surface is displaced, in a direction intersecting the optical axial direction, from a center of an outer circumference of the side surface at a position distanced from the lens surface in the optical axial direction, and
   the side surface is a straight line in a cross-sectional plane parallel to the optical axial direction and crossing the lens surface.

2. The optical component according to claim 1, wherein
   the center of the outer circumference of the lens surface is displaced, in the direction intersecting the optical axial direction, from the center of the outer circumference of the side surface at the position distanced from the lens surface in the optical axial direction, by a distance not less than 1% and not more than 30% an outer diameter of the side surface at the position distanced from the lens surface in the axial optical direction.

3. The optical component according to claim 1, further comprising:
   a frame body including a tapered engaging surface corresponding to the side surface of the lens, the lens being fitted in the frame body, wherein
   the lens is fitted in the frame body and is positioned in a circumferential direction about the optical axial direction.

4. The optical component according to claim 1, wherein
   the lens includes an end surface orthogonal to the axial optical direction and connects an outer circumference of the end surface and the outer circumference of the lens surface.

5. The optical component according to claim 1, wherein
   the side surface of the lens includes a first tapered portion having an outer diameter progressively smaller away from a reference plane in a first direction along the optical axial direction and a second tapered portion having an outer diameter progressively smaller away from the reference plane in a second direction opposite to the first direction, the reference plane being orthogonal to the optical axial direction, and
   the lens surface includes a first lens surface and a second lens surface, an outer circumference of the first lens surface being defined by a first edge of the first tapered portion at a position distanced from the reference plane in the first direction, and an outer circumference of the second lens surface being defined by a second edge of the second tapered portion at a position distanced from the reference plane in the second direction.

6. An optical component comprising:
   a lens that includes a lens surface and a tapered side surface, the tapered side surface extending from an outer circumference of the lens surface in an optical axial direction that intersects the lens surface and having an outer diameter progressively larger away from the lens surface, wherein
   an angle of inclination of the side surface with respect to a plane orthogonal to the optical axial direction differs depending on a position in a circumferential direction about the optical axial direction, and
   the side surface is a straight line in a cross-sectional plane parallel to the optical axial direction and crossing the lens surface.

7. The optical component according to claim 6, wherein
   an angle of inclination of a side surface of the lens with respect to the plane orthogonal to the optical axial direction is not less than 65° and not more than 80°, and a difference between a maximum value and a minimum value of the angle of inclination is not less than 1° and not more than 15°.

8. The optical component according to claim 6, further comprising:
   a frame body including a tapered engaging surface corresponding to the side surface of the lens, the lens being fitted in the frame body, wherein
   the lens is fitted in the frame body and is positioned in a circumferential direction about the optical axial direction.

9. The optical component according to claim 6, wherein
   the lens includes an end surface orthogonal to the optical axial direction and connects an outer circumference of the end surface and the outer circumference of the lens surface.

10. The optical component according to claim 6, wherein
    the side surface of the lens includes a first tapered portion having an outer diameter progressively smaller away from a reference plane in a first direction along the optical axial direction and a second tapered portion having an outer diameter progressively smaller away from the reference plane in a second direction opposite to the first direction, the reference plane being orthogonal to the optical axial direction, and the lens surface includes a first lens surface and a second lens surface, an outer circumference of the first lens surface being defined by a first edge of the first tapered portion at a position distanced from the reference plane in the first direction, and an outer circumference of the second lens surface being defined by a second edge of the second tapered portion at a position distanced from the reference plane in the second direction.

11. A method of manufacturing an optical component comprising building a hardened layer on a reference plane, the hardened layer being formed by irradiating a photocrosslinkable material ejected from a molding head with light, thereby forming a lens, the lens including a tapered side surface, which has an outer diameter progressively smaller away from the reference plane in an optical axial direction, and a lens surface having an outer circumference defined by an edge of the side surface, and a center of the outer circumference of the lens surface being displaced, in a direction along the reference plane, from a center of an outer circumference of the side surface on the reference plane, and the side surface is a straight line in a section cross-sectional plane parallel to the optical axial direction and crossing the lens surface.

12. The method of manufacturing an optical component according to claim 11, comprising:

building the hardened layer on the reference plane to form a first lens portion, the first lens portion including a first tapered portion and a first lens surface, the first tapered portion having an outer diameter progressively smaller away from the reference plane in the optical axial direction, and an outer circumference of the first lens surface being defined by an edge of the first tapered portion;

inverting the first lens portion upside down and fixing the first lens portion; and building the hardened layer on a bottom surface of the first tapered portion to form a second lens portion, the second lens portion including a second tapered portion and a second lens surface, the second tapered portion having an outer diameter progressively smaller away from the bottom surface in the optical axial direction, and an outer circumference of the second lens surface being defined by an edge of the second tapered portion.

13. The method of manufacturing an optical component according to claim 12, wherein fixing the first lens portion includes fitting the first lens portion in a clamping jig having an engaging surface having a shape corresponding to the first tapered portion.

14. The method of manufacturing an optical component according to claim 13, further comprising:

building the hardened layer to form the clamping jig.

* * * * *